US011625471B2

(12) United States Patent
Lee et al.

(10) Patent No.: US 11,625,471 B2
(45) Date of Patent: Apr. 11, 2023

(54) METHOD FOR PROVIDING AUTOFILL FUNCTION AND ELECTRONIC DEVICE INCLUDING THE SAME

(71) Applicant: Samsung Electronics Co., Ltd., Gyeonggi-do (KR)

(72) Inventors: Seonho Lee, Gyeonggi-do (KR);
Kyungtae Kim, Gyeonggi-do (KR);
Hosung You, Gyeonggi-do (KR);
Bunam Jeon, Gyeonggi-do (KR);
Yoonjeong Choi, Gyeonggi-do (KR);
Taeho Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 16/678,178

(22) Filed: Nov. 8, 2019

(65) Prior Publication Data

US 2020/0151315 A1 May 14, 2020

(30) Foreign Application Priority Data

Nov. 9, 2018 (KR) .......................... 10-2018-0136987

(51) Int. Cl.
*G06F 21/35* (2013.01)
*G06F 21/43* (2013.01)
(Continued)

(52) U.S. Cl.
CPC .......... *G06F 21/35* (2013.01); *G06F 3/04883* (2013.01); *G06F 21/32* (2013.01);
(Continued)

(58) Field of Classification Search
CPC .......... G06F 21/35; G06F 17/24; G06F 21/44; G06F 21/43; G06F 21/32; G06F 3/04883
See application file for complete search history.

(56) References Cited

U.S. PATENT DOCUMENTS 9,218,332 B2 12/2015 Bhatia et al.
9,288,609 B2 3/2016 Kwon et al.
(Continued)

FOREIGN PATENT DOCUMENTS

KR 10-2018-0089803 A 8/2018
WO 2015/142031 A1 9/2015

OTHER PUBLICATIONS

"iOs 11's New 'Password Autofill for Apps' Won't Work with (or replace) Your Favorite Password Manager"—Sarah Perez, Tech Crunch, Jun. 8, 2017 https://techcrunch.com/2017/06/08/ios-11s-new-password-autofill-for-apps-wont-work-with-or-replace-your-favorite-password-manager/ (Year: 2017).*

(Continued)

*Primary Examiner* — Randy A Scott
(74) *Attorney, Agent, or Firm* — Cha & Reiter, LLC

(57) ABSTRACT

An electronic device and method are disclosed, the method including a communication circuitry, a memory storing an application, a display, and a processor operatively connected with the communication circuitry, the memory, and the display. The processor executes the method, including: receiving a request to execute the application, outputting an information input screen relevant to executing the application on the display based on the request, receiving at least one piece of input information to be entered into the information input screen, from a specific external electronic device via the communication circuitry, and automatically entering the at least one piece of input information into the information input screen.

16 Claims, 10 Drawing Sheets

(51) Int. Cl.
*G06F 21/32* (2013.01)
*G06F 21/44* (2013.01)
*G06F 3/04883* (2022.01)
*G06F 40/174* (2020.01)

(52) U.S. Cl.
CPC .............. *G06F 21/43* (2013.01); *G06F 21/44* (2013.01); *G06F 40/174* (2020.01)

(56) References Cited

U.S. PATENT DOCUMENTS

| | | | |
|---|---|---|---|
| 10,079,826 | B2 | 9/2018 | Hamid |
| 2005/0091539 | A1* | 4/2005 | Wang ...................... G06F 21/31 726/4 |
| 2013/0347128 | A1* | 12/2013 | Cumming ........... H04W 12/062 726/28 |
| 2014/0189808 | A1* | 7/2014 | Mahaffey .............. H04L 63/083 726/4 |
| 2014/0302799 | A1 | 10/2014 | Kwon et al. |
| 2015/0205776 | A1 | 7/2015 | Bhatia et al. |
| 2015/0271164 | A1 | 9/2015 | Hamid |
| 2015/0288676 | A1* | 10/2015 | Guo ...................... H04L 63/083 726/7 |
| 2016/0070691 | A1 | 3/2016 | Bhatia et al. |
| 2016/0342784 | A1* | 11/2016 | Beveridge ............... G06F 21/34 |
| 2017/0011623 | A1 | 1/2017 | Kim et al. |
| 2017/0019699 | A1* | 1/2017 | Kim .................... G06F 3/03547 |
| 2017/0195307 | A1* | 7/2017 | Jones-McFadden ......................... H04W 12/06 |
| 2017/0357627 | A1 | 12/2017 | Peterson et al. |
| 2018/0218135 | A1 | 8/2018 | Cho et al. |
| 2019/0080189 | A1* | 3/2019 | Van Os .............. H04N 5/23216 |
| 2019/0268648 | A1 | 8/2019 | Kim et al. |

OTHER PUBLICATIONS

"Add/Remove Devices to the List of Registered Devices in Account Manager"—Autodesk, Dec. 14, 2017 https://forums.autodesk.com/t5/installation-licensing/add-remove-devices-to-the-list-of-registered-devices-in-account/td-p/7623202 (Year: 2017).*
International Search Report dated Feb. 28, 2020.
European Search Report dated Nov. 2, 2021.
Indian Office Action dated Jan. 11, 2023.

* cited by examiner

METHOD FOR PROVIDING AUTOFILL FUNCTION AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2018-0136987, filed on Nov. 9, 2018, in the Korean Intellectual Property Office, the disclosure of which is incorporated by reference herein its entirety.

BACKGROUND

1. Technical Field

The disclosure relates to the access of functions in an electronic device, and, more particularly, to an autofill function for entering authentication information in an electronic device.

2. Description of Related Art

Recently, electronic devices have advanced and are now capable of supporting a variety of services. For example, televisions (TVs) are capable of connecting to the Internet to support user search functions and streaming multimedia playback, beyond the traditional functions of receiving and outputting broadcast signals. Furthermore, large screen mobile electronic devices have advanced and can now provide various application-based user functions based on wireless communication.

The above information is presented as background information only to assist with an understanding of the disclosure. No determination has been made, and no assertion is made, as to whether any of the above might be applicable as prior art with regard to the disclosure.

SUMMARY

An electronic device, such as TV, generally supports inputs through user manipulation of a remote control, and more rarely, a touch screen function. Accordingly, a user typically enters information using the remote control or the touch screen. In this operation, if a user is unfamiliar with the remote control or the touch screen, they may feel inconvenience when entering information. To solve this problem, information stored in memory of the TV may be utilized. However, when information is stored in an electronic device, and the electronic device is used by a plurality of users, the information of one user may be mixed with information of another user. When the desired information pertains to secure access and authentication information, a security problem is introduced by the comingling of this information.

Aspects of the disclosure are to address at least the above-mentioned problems and/or disadvantages and to provide at least the advantages described below. Accordingly, an aspect of the disclosure is to provide an autofill function providing method for processing information entry performed in a first electronic device with information previously stored in a second electronic device or supporting information entry using an input device provided in the second electronic device, and an electronic device supporting the method.

In accordance with an aspect of the disclosure, an electronic device includes a communication circuitry, a memory storing an application, a display, and a processor operatively connected with the communication circuitry, the memory, and the display, wherein the memory includes instructions that, when executed, cause the processor to: receive a request to execute the application, output an information input screen relevant to executing the application on the display based on the request, receive at least one piece of input information to be entered into the information input screen, from a specific external electronic device via the communication circuitry, and automatically enter the at least one piece of input information into the information input screen.

In accordance with another aspect of the disclosure, a method for an electronic device is disclosed, including: receiving, by a processor, a request to execute an application, outputting an information input screen relevant to executing the application on a display based on the request, transmitting a request message requesting at least one piece of input information for entry into the information input screen, from a specific external electronic device using a communication circuitry, and receiving a response message including the at least one piece of input information from the external electronic device, automatically entering the at least one piece of input information into the information input screen.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to the description of the drawings, identical or similar reference numerals may be used to refer to identical or similar components.

DETAILED DESCRIPTION

Hereinafter, certain embodiments of the disclosure will be described with reference to the accompanying drawings. However, those of ordinary skill in the art will recognize that modification, equivalent, and/or alternative on the certain embodiments described herein can be variously made without departing from the disclosure.

Figure 1:
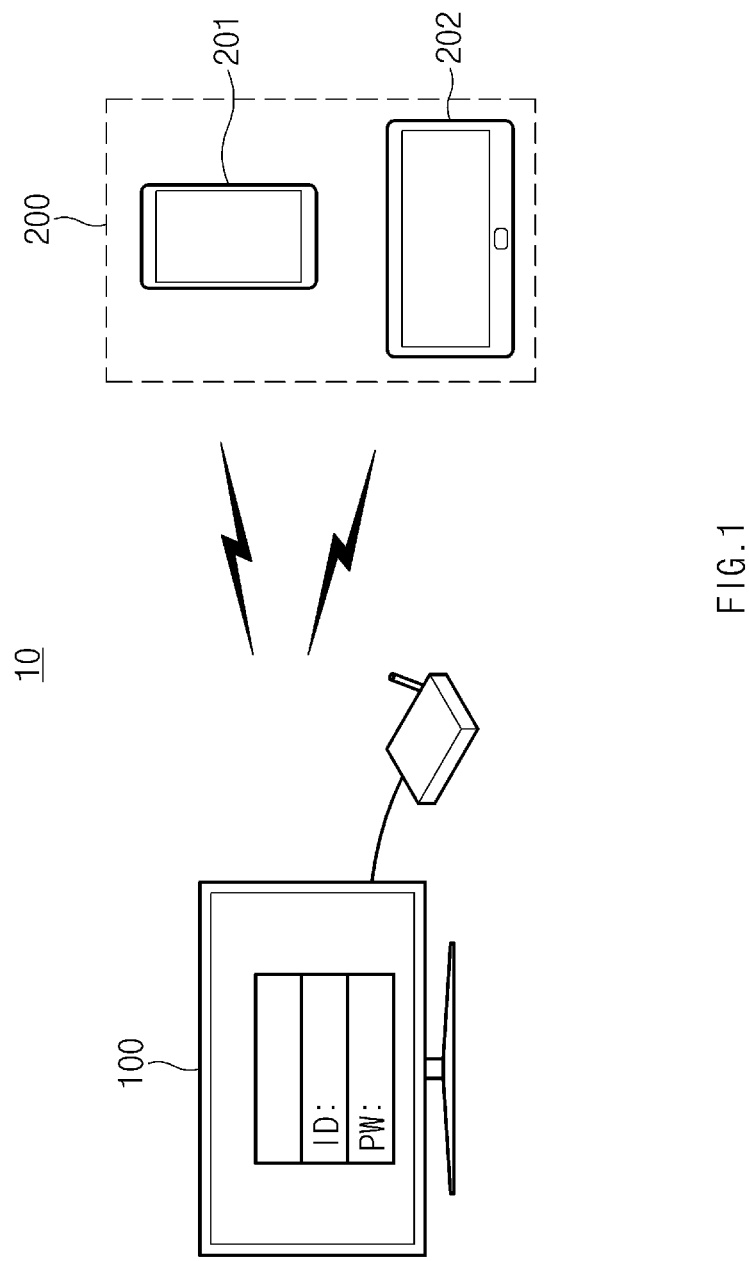
FIG. 1 is a view illustrating an example of a configuration of a system operated in an autofill function support environment according to certain embodiments.

FIG. 1 is a view illustrating an example of a configuration of a system operated in an autofill function support environment according to certain embodiments.

Referring to FIG. 1, a system operating in an autofill function support environment 10, according to an embodiment of the disclosure, may include a first electronic device 100 executing a specific app and at least one second electronic device (e.g., 201 or 202) (or, at least one external electronic device) that provides input information relevant to operation of the app in the first electronic device 100.

In an embodiment, the first electronic device 100 may store at least one app to enable the execution of the specific app and may output a screen according to the execution of the app. The execution of the app may include, for example, an operation utilizing the input information. The first electronic device 100 may establish a communication channel with a second electronic device 200 and may obtain, from the second electronic device 200, the input information according to the execution of the app. The first electronic device 100 may enter the input information, which is obtained without a separate user input, based on an autofill function to perform application of the app (e.g., perform user authentication according to application of authentication information) and may output, on a display, an app operation screen according to the application of the input information. For example, the first electronic device 100 may transmit, to the second electronic device 200, at least one of identification information of the app requested to be executed or an input screen utilizing the application of the input information and may request the input information to be applied to the corresponding app from the second electronic device 200. In an embodiment, after the application of the input information, the first electronic device 100 may delete the received input information to prevent another user from using the input information (e.g., authentication information) that the second electronic device 200 provides in relation to the operation of the app in the first electronic device 100. According to certain embodiments, in the case where there is a history of having connected with a plurality of second electronic devices 200, the first electronic device 100 may store input information for each of the second electronic devices 200, and when a specific second electronic device 200 is connected to the first electronic device 100, the first electronic device 100 may search for the input information corresponding to the relevant second electronic device 200 or may use the input information as autofill information. In this regard, the first electronic device 100 may store the input information relevant to the second electronic devices 200 in a security memory area and may use the input information stored in the security memory area (e.g., the input information relevant to the second electronic device 200 currently connected to the first electronic device 100), by using the connection of the specific second electronic device 200 as a trigger signal. In the case where a plurality of pieces of input information are stored in the security memory area to a specified level or higher, the first electronic device 100 may delete the plurality of pieces of input information, based on the order in which the plurality of pieces of input information are stored or the number of times that the plurality of pieces of input information are used. For example, the first electronic device 100 may be an IPTV, a TV having an input function, or an electronic device such as a personal computer (PC), a tablet PC, a kind of pad, a portable terminal, or a smartphone.

The second electronic device 200 may include one or more electronic devices that establish a communication channel with the first electronic device 100. Although two second electronic devices are illustrated in FIG. 1, the disclosure is not limited thereto. For example, three or more second electronic devices may be provided. The second electronic device 200 may be an electronic device that stores input information entered by a user. For example, the second electronic device 200 may be at least one of a smartphone, a wearable electronic device, a slate PC, an electronic device of a pad type, or a smart audio device (e.g., a device that collects a user's voice input and executes an app according to the voice input). The second electronic device 200 may receive a request for input information from the first electronic device 100. The second electronic device 200 may provide specified input information to the first electronic device 100 in response to the request for the input information. In this operation, the second electronic device 200 may output a confirmation screen relating to the transmission of the input information and may transmit the input information to the first electronic device 100 when a user input occurs. Alternatively, the second electronic device 200 may automatically transmit the input information to the first electronic device 100 according to a previous history. According to certain embodiments, the second electronic device 200 may transmit the input information and app identification information, as a push message, to the first electronic device 100. In this case, the first electronic device 100 may operate the autofill function in a process of applying the received input information to an app in response to a request of the second electronic device 200. The second electronic device 200 may be an electronic device of the same type as, or a different type from, the first electronic device 100. For example, to store data relevant to the autofill function and provide the data to the first electronic device 100, the second electronic device 200 may be an IPTV including a memory, communication circuitry, and a process, a TV having an input function, or an electronic device such as a PC, a tablet PC, a kind of pad, a portable terminal, or a smartphone.

Even though input information is not directly entered, the autofill function support environment 10 according to certain embodiments may obtain input information entered into another electronic device located nearby, may enter the input information using the autofill function, and may process application of the input information. Accordingly, the first electronic device 100 according to certain embodiments may more rapidly and conveniently perform information entry and may support operation of an app according to the corresponding information entry.

Figure 2:
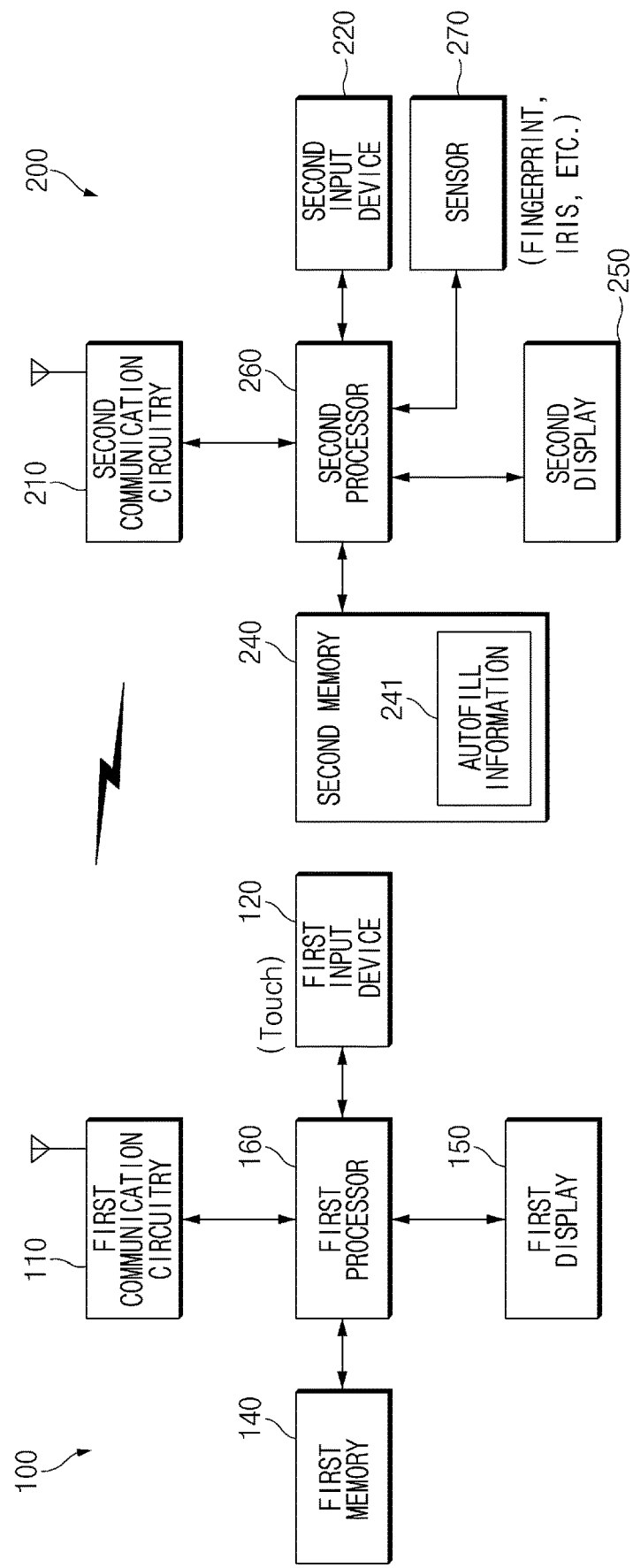
FIG. 2 is a view illustrating an example of components included in electronic devices included in the autofill function support environment according to certain embodiments.

FIG. 2 is a view illustrating an example of components included in the electronic devices included in the autofill function support environment according to certain embodiments.

Referring to FIG. 2, the first electronic device 100 may include at least one of first communication circuitry 110, a first input device 120, a first memory 140, a first display 150, or a first processor 160. In an embodiment, the first electronic device 100 may further include communication circuitry connected with an external network in relation to execution of a specific app. For example, the first electronic device 100 may further include an Internet communication module, a mobile communication module, or a 5G communication module that is capable of connecting to an Internet network.

According to an embodiment, the first communication circuitry 110 may support a communication function of the first electronic device 100. The first communication circuitry 110 may include at least one of, for example, Internet network communication circuitry for Internet network access, broadcast receiving circuitry for receiving a broadcast, or mobile communication circuitry associated with supporting a mobile communication function, and/or short-range communication circuitry for establishing a communication channel with the second electronic device 200. The first communication circuitry 110 may be used to transmit, to the second electronic device 200, app identification information and a message for requesting input information (e.g., authentication information) and receive a response according to the transmission of the app identification information and the message. For example, the first communication circuitry 110 may include circuitry that directly performs communication without a repeater such as Bluetooth, WiFi direct, or the like. According to an embodiment, the first communication circuitry 110 may include a WiFi communication module (or circuitry) for Internet network access and/or a WiFi direct communication module (or a Bluetooth communication module) for transmitting and receiving the input information.

According to an embodiment, the first input device 120 may include a device for receiving a user input in relation to operation of a function of the first electronic device 100. For example, in the case where the first display 150 is a touch screen that supports a touch function, the first input device 120 may include the first display 150 as an input device. According to certain embodiments, the first input device 120 may include a microphone and voice recognition circuitry (or module) for analyzing a user's voice collected through the microphone and processing the analyzed voice as an instruction. In another example, the first input device 120 may include an electronic pen and an electromagnetic induction panel that supports operation of the electronic pen. In another example, the first input device 120 may include a remote controller that enables an input from a long distance and a receiver that receives and processes a signal transmitted from the remote controller. As described above, the first input device 120 in the first electronic device 100 may include at least one of various types or kinds of devices.

According to an embodiment, the first input device 120 may receive an input signal for executing at least one app stored in the first memory 140. Alternatively, the first input device 120 may receive an input signal for executing at least one app designed to output, on the first electronic device 100, an execution screen executed in a specific server. When the corresponding input signal occurs, the first input device 120 may request the first processor 160 to execute the app.

The first input device 120 may receive a user input relevant to an input of the executed app. For example, the first input device 120 may receive a user input for selecting any one of a plurality of pieces of information (e.g., a plurality of pieces of identification information of the second electronic devices) that correspond to a plurality of pieces of input information. In another example, the first input device 120 may receive a user input for requesting a change in at least part of selected input information.

In an embodiment, the first memory 140 may store an operating system relevant to operation of the first electronic device 100 and/or at least one app. In another example, the first memory 140 may temporarily store input information received from at least one second electronic device 200 and/or identification information of each electronic device. In another example, the first memory 140 may store screen information according to execution of a specific app and may provide the screen information to the first display 150 in response to control of the first processor 160. According to certain embodiments, the first memory 140, although not storing input information, may store identification information of at least one second electronic device 200 that transmits and receives the input information, or history management information of the at least one second electronic device 200.

The first display 150 may output at least one screen relevant to operation of the first electronic device 100. The first display 150 may include a touch function. In this case, the first display 150 may operate as the first input device 120. The first display 150 may output a selection screen for selecting at least one app stored in the first memory 140. Alternatively, the first display 150 may output a selection screen for selecting a broadcast receiving channel.

According to an embodiment, the first display 150 may output a login screen that utilizes input information in relation to execution of a specific app. For example, the login screen may be output at the time of execution of at least one app, access to a specific server, or execution of a specific app of the first electronic device 100 or approach to a memory area (e.g., a security memory area).

According to an embodiment, the first display 150 may output a list that includes information representing connection states with one or more second electronic devices 200, information representing receipt of input information from the second electronic devices 200, and/or identification information of the second electronic devices 200 that corresponds to the received input information. When application of input information is completed according to selection or application of specific input information, the first display 150 may output a screen of an app relevant to the application of the input information (e.g., an app execution screen after completion of authentication) according to the completion of the application of the input information.

According to an embodiment, a request for input information may be periodically performed. Accordingly, the first electronic device 100 may periodically receive the input information from a specified second electronic device 200 and may perform information entry through the autofill function. In this operation, in the case where the input information is authentication information according to an embodiment, the first display 150 may output a guide message regarding completion of user authentication every time the user authentication is performed based on the received authentication information, or may output a guide message according to completion of user authentication when the user authentication is performed for the first time, and may output no guide message regarding completion of the next user authentication. In the case where the periodically performed user authentication is not processed (e.g., a communication channel between the first electronic device 100 and the second electronic device 200 is deactivated), the first display 150 may output a screen according to the authentication failure. In the case of the authentication failure, the app may be temporarily stopped or ended, and the first display 150 may output a screen (e.g., an exit screen or a contents output stop screen) according to the authentication failure.

According to an embodiment, the first processor 160 may control transfer and processing of a signal, or data access, which is relevant to operation of the first electronic device 100. The first processor 160, for example, may output a list (or icons) of apps stored in the first memory 140 in response to a user input, or may output at least one app list (or icons) that the first electronic device 100 provides. When an app utilizing an autofill function for information entry is selected, the first processor 160 may output a screen relevant to the information entry on the first display 150.

According to an embodiment, the first processor 160 may transmit a message to request input information according to specified scheduling information or in response to a user input. According to an embodiment, the first processor 160 may output the input information request message in the manner of broadcast. In another example, the first processor 160 may perform scanning using short-range communication circuitry and may transmit the input information request message to at least one second electronic device 200 found according to the scanning. According to certain embodiments, the first processor 160 may identify a history of transmission and reception of input information and may transmit the input information request message to the second electronic device 200 that has a history of having transmitted and received the input information. According to certain embodiments, the first processor 160 may transmit the input information request message to the second electronic device 200 that has a recent input information transmission/reception history or the second electronic device 200 that has the largest number of histories.

According to an embodiment, when receiving input information from one or more second electronic devices 200, the first processor 160 may generate a list based on the received input information and may output the list on the first display 150. In the output operation, the first processor 160 may generate and output a list of identification information of the second electronic devices 200 that corresponds to the input information. The first processor 160, after outputting the list, may enter input information selected by a user input as login information. For example, a user may perform a user input to select specific identification information from the identification information of the second electronic devices 200. When receiving the user input for selecting the specific identification information from the first input device 120, the first processor 160 may automatically enter the input information corresponding to the relevant identification information as input information. According to certain embodiments, the first processor 160 may automatically select input information provided by a specified second electronic from the received input information and may apply the selected input information to an input screen. For example, the first processor 160 may automatically enter the input information on a login screen according to the autofill function.

According to an embodiment, when a user input for requesting confirmation of the application of the input information occurs after the automatic input information entry, the first processor 160 may perform application of the input information (e.g., authentication). In another example, after the automatic input information entry, the first processor 160 may automatically process application of the input information to an app. For example, in the case where the input information is authentication information, the first processor 160 may transmit the received authentication information to a server relevant to the corresponding app and may request confirmation of authentication. In another example, the first processor 160 may compare information previously stored in the first memory 140 and the currently entered input information and may perform authentication according to the comparison result.

When the application of the input information to the app is normally performed, the first processor 160 may execute the corresponding app and may output a screen according to the execution of the app on the first display 150. In the case where the application of the input information to the app (e.g., authentication) fails, the first processor 160 may output a guide message relevant to the failure in the application of the input information.

According to an embodiment, in the above-described operation, the first processor 160 may display the second electronic devices capable of being connected at present, in relation to the transmission of the input information request message. In another example, the first processor 160 may differently output an electronic device having a previous connection history and an electronic device having no connection history, among the devices capable of being connected. According to certain embodiments, the first processor 160 may differently display an item for a second electronic device having input information utilized for operation of the autofill function of the currently running app and an item for another electronic device. For example, the first processor 160 may highlight an item for a second electronic device having input information that is to be applied to an app. In this regard, in the case where an application operation (e.g., an authentication operation) is normally performed in app execution request reception and application operations, the first electronic device 100 may map, store, and manage identification information of the corresponding second electronic device and app identification information together. In the case where a second electronic device having a previous history in relation to operation of the autofill function of the currently running app is able to be connected, the first processor 160 may automatically transmit an input information request message to the second electronic device having the previous history.

According to certain embodiments, in the case where the second electronic device having the previous history in relation to the operation of the autofill function of the currently running app is not connected, the first processor 160 may output a guide message (e.g., an audio guide sound, or a guide text or image) to request connection. In the case where the second electronic device 200 enters within a specified distance and establishes a short-range communication channel, the first processor 160 may automatically transmit an input information request message and may receive input information. In this regard, after outputting the connection request guide message, the first processor 160 may maintain a communication standby state for connection for a specified period of time, or may transmit a communication connection request signal. The input information request message may include, for example, an app ID or uniform resource locator (URL) information. When receiving encrypted input information from the second electronic device 200, the first processor 160 may decode the encrypted input information and may perform user authentication based on the decoded input information.

According to an embodiment, the second electronic device 200 may include second communication circuitry 210, a second input device 220, a second memory 240, a second display 250, a sensor 270, and a second processor 260. Additionally or alternatively, the second electronic device 200 may further include a speaker for outputting an audio signal and a microphone for collecting an audio signal.

According to an embodiment, the second communication circuitry 210 may establish a communication channel in relation to a communication function of the second electronic device 200. For example, the second communication circuitry 210 may include a short-range communication module for establishing a communication channel with the first electronic device 100 and a long-range communication module for connecting to a server through a network. The long-range communication module may include, for example, communication circuitry for connecting to a mobile communication network or communication circuitry for connecting to an Internet network. The second communication circuitry 210 may connect to a specific server in response to user control or may connect to the server in response to a request for execution of an app, and may identify input information requested by the server and may receive data relevant to a service (e.g., a data service or an audio service) that the corresponding server provides. The second communication circuitry 210 may maintain a communication standby state to establish a communication channel with the first electronic device 100. When receiving a communication connection request message from the first electronic device 100, the second communication circuitry 210 may establish a communication channel with the first electronic device 100. In another example, the second communication circuitry 210 may transmit a communication connection request message for communication connection with the first electronic device 100 in the communication standby state in response to user control and may establish a communication channel with the first electronic device 100.

According to an embodiment, the second input device 220 may include a component for generating an input signal of the second electronic device 200. For example, the second input device 220 may include various means such as a physical button, a touch screen, or a sound input device. The second input device 220 may generate an input signal relevant to communication connection with the first electronic device 100 or an input signal relevant to transmission of input information according to a user operation and may transfer the generated input signal to the second processor 260.

According to an embodiment, the second memory 240 may store an operating system relevant to operation of the second electronic device 200 and/or at least one app. According to certain embodiments, the second memory 240 may store autofill information 241. The autofill information 241 may include identification information of an app and input information entered on a screen of the app.

According to an embodiment, the second display 250 may output at least one screen relevant to operation of the second electronic device 200. For example, the second display 250 may output a selection screen for selecting at least one app and an app execution screen according to a specific app execution request. When receiving an input information request message from the first electronic device 100, the second display 250 may output a screen relevant to the input information request message. For example, the second display 250 may output a screen for inquiring whether to transmit input information or a screen relevant to transmission of input information.

According to an embodiment, the sensor 270 may include at least one sensor for collecting user-related biometric information. For example, the sensor 270 may include a fingerprint sensor for obtaining fingerprint information of the user, an image sensor for obtaining face form information of the user, or an iris sensor for obtaining iris information of the user. Information collected by the sensor 270 may be encrypted and stored. The sensor 270 may be activated in response to control of the second processor 260 in an environment in which user authentication is utilized in relation to an autofill function of input information, and may be deactivated according to collection of biometric information.

According to an embodiment, the second processor 260 may perform transfer and processing of a signal relevant to operation of the second electronic device 200. For example, when receiving an input information request message from the first electronic device 100, the second processor 260 may output guide information about the receipt of the message on the second display 250. When receiving an input relevant to user identification (e.g., an input for requesting transmission of input information), the second processor 260 may transmit input information requested by the first electronic device 100. In this regard, the second processor 260 may identify app identification information or URL information that is included in the input information request message, and may determine whether information corresponding to the autofill information 241 exists. In the case where the corresponding information is included in the autofill information 241, the second processor 260 may collect input information and may transmit the collected input information to the first electronic device 100.

Figure 3:
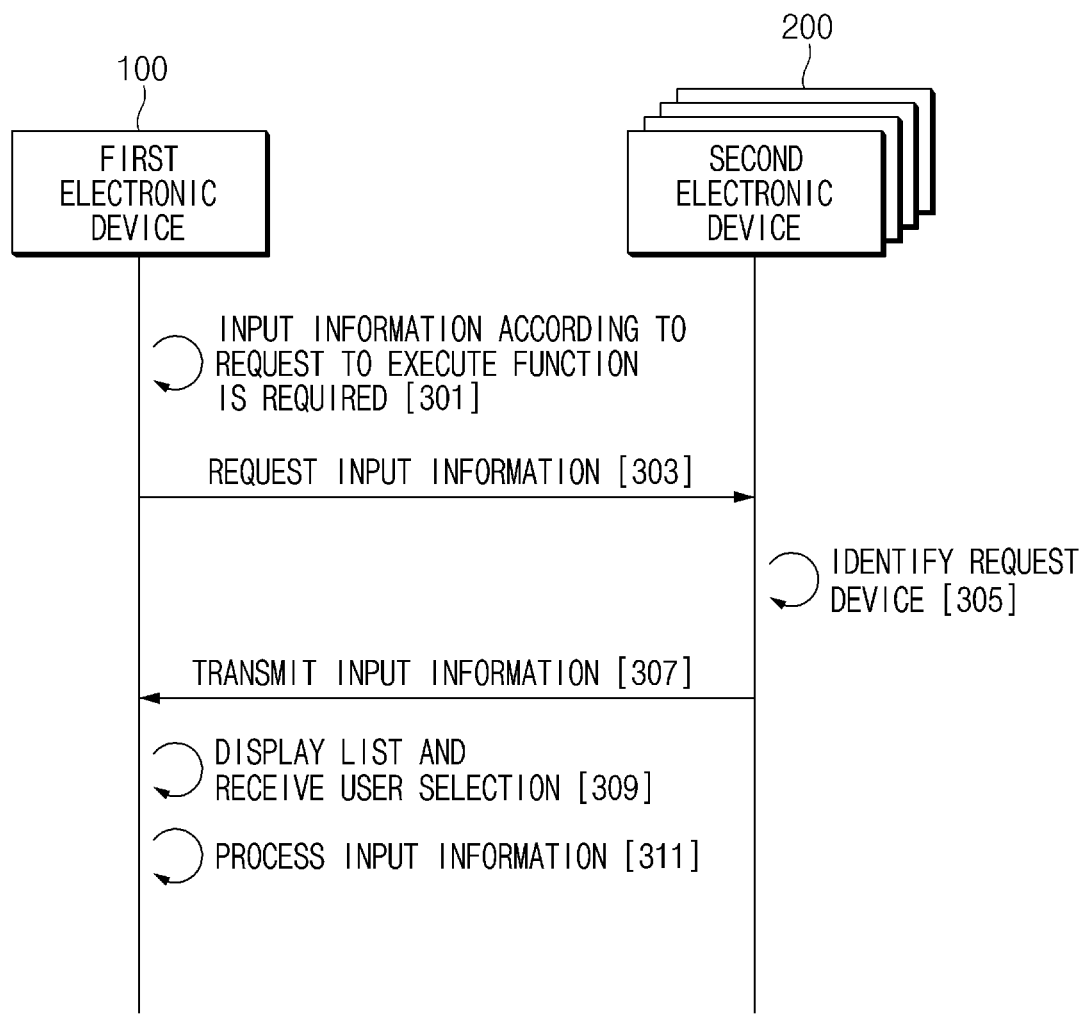
FIG. 3 is a view illustrating an example of a signal flow between components of the system associated with providing an autofill function according to certain embodiments.

FIG. 3 is a view illustrating an example of a signal flow between components of the system associated with providing an autofill function according to certain embodiments.

In the following description, an autofill function of authentication information as input information will be described for the purposes of illustration. However, the disclosure is not limited to the specific disclosure. For example, the first electronic device 100 may output an input screen requesting the entry of some specific information (e.g., for authentication), and may receive, from the second electronic device 200, input information (e.g., authentication information) relevant to the autofill function and is capable of being entered on the input screen. The first electronic device 100 may then automatically enter the received input information on the input screen. In this regard, the first electronic device 100 may transmit information relevant to the input screen (e.g., app identification information or input screen identification information) to the second electronic device 200. The second electronic device 200 may detect the input information mapped with the information relevant to the input screen (e.g., retrieved from autofill information stored in the second memory) and may transmit the detected input information to the first electronic device 100. The first electronic device 100 may automatically enter the input information received from the second electronic device 200 on the input screen. Accordingly, the first electronic device 100 may receive the information utilized for the autofill function from the second electronic device 200 connected thereto through a communication channel and may process the information.

Referring to FIG. 3, with regard to providing an autofill function, in operation 301, the first processor 160 of the first electronic device 100 may utilize input information (e.g., authentication information) to be used for the autofill function according to a request to execute an app. In this regard, the first electronic device 100 may output menus or icons relevant to execution of one or more apps, and may output a login screen for execution of an app selected by a user input. In another example, the first electronic device 100 may connect to a specific server according to a specified schedule, or may connect to the specific server according to a user input, and may receive, from the server, login screen information for requesting user authentication and output the received login screen information.

In the case where the input information is desired, the first processor 160 of the first electronic device 100 may, in operation 303, transmit an input information request message to one or more second electronic devices 200. In this operation, the first processor 160 may transmit the input information request message including either app identification information or URL information.

In the transmission of the input information request message, the first processor 160 may transmit the input information request message to one or more specified second electronic devices 200, or may output the input information request message in the manner of broadcast. For example, in the case where the input information is requested, the first processor 160 may identify an input information reception history and may transmit the input information request message to the second electronic devices 200 registered in the input information reception history. In this regard, the first processor 160 may scan surroundings using a communication module and may transmit the input information request message to the second electronic devices 200 included in the input information reception history, among the scanned surrounding electronic devices.

According to certain embodiments, the first processor 160 may identify an app selected in operation 301 and may identify a history of received input information related to operation of the corresponding app. The first processor 160 may scan for a second electronic device (e.g., at least one of the second electronic devices 200) corresponding to the identified reception history, and when the second electronic device is discovered, transmit the input information request message to the second electronic device. In this operation, in the case where the second electronic device registered in the reception history is not found, the first processor 160 may output a message indicating a failure to detect the registered second electronic device, and may repeat execution of the scan for a specified period of time, and/or until the registered second electronic device is found.

In the case where the registered second electronic device enters a coverage area and is scanned during the repeated scanning, the first processor 160 may establish a communication channel with the registered second electronic device and may transmit the input information request message to the registered second electronic device. In another example, the first processor 160 may transmit the input information request message until the registered second electronic device provides a response message for the input information request message, or may consistently transmit the input information request message for a specified period of time. In this operation, in the case where there is no response for the specified period of time, the first processor 160 may output guide information, such as retry or termination of connection, on the first display 150. In the case where the registered second electronic device is not found, the first processor 160 may output the input information request message in the manner of broadcast.

In the case where the one or more second electronic devices 200 receive the input information request message, the second processors 260 of the second electronic devices 200 may, in operation 305, identify the requesting device (e.g., the first electronic device 100). For example, the second electronic devices 200 may identify identification information of the first electronic device 100 that transmitted the input information request message. Thereafter, each of the second electronic devices 200 may determine whether there is a history of transmitted input information (e.g., information (e.g., authentication information) capable of being entered in relation to the function execution of the app that is being executed in the first electronic device 100) to the first electronic device 100. For example, the second processors 260 may determine, through the autofill information 241, whether the first electronic device 100 is registered.

When the requesting device is identified, the second processors 260 of the second electronic device(s) 200 may, in operation 307, transmit the input information requested by the first electronic device 100 to the first electronic device 100. For example, in the case where the first electronic device 100 is registered in association with the autofill information 241, the second processors 260 may collect the requested input information and automatically transmit the collected input information to the first electronic device 100. In another example, in the case where the first electronic device 100 is not registered in association with the autofill information 241, the second processors 260 may output, through an output device (e.g., the second display 250), information querying whether to transmit the input information to the first electronic device 100. The second processors 260 may transmit the input information to the first electronic device 100 based on a subsequent user selection responsive to the query. In this operation, the second processors 260 may determine whether there is input information corresponding to the app identification information or the URL information that is included in the received input information request message, and in the case where the corresponding input information exists, the second processors 260 may automatically transmit the corresponding input information, or may inquire the user whether to transmit the corresponding input information. In the case where there is no input information corresponding to the input information request message, the second processors 260 may ignore the input information request message.

When the first electronic device 100 receives the input information, the first processor 160 of the first electronic device 100 may, in operation 309, display a list corresponding to the received input information and receive a user selection. In this regard, the first processor 160 may generate a list based on identification information of the second electronic devices 200 that corresponds to the received input information. In another example, the first processor 160 may generate the list by using icons, images, and/or texts that represent the second electronic devices 200.

When specific input information in the list is selected by a user selection, the first electronic device 100 may, in operation 311, apply the selected input information and perform an information entry function (e.g., a function of automatically entering user authentication information or information such as a password) according to the autofill function. When a specific function (e.g., login or authentication) is normally performed based on the information entered according to the autofill function, the first electronic device 100 may execute the app according to the performance of the specific function (e.g., authentication or login) and may output a screen according to the execution of the app on the first display 150. In an embodiment, in the case where there is no history regarding the second electronic device that provides the input information, the first electronic device 100 may newly register the second electronic device. For example, the first processor 160 of the first electronic device 100 may record information including at least one of the identification information of the second electronic device providing the input information, the app ID or the URL information, whether the input information is selected by the user, or whether the input information is applied (e.g., a success or failure in authentication). The recorded information may be used later to select a destination device to which the first electronic device 100 transmits an input information request message.

Figure 4:
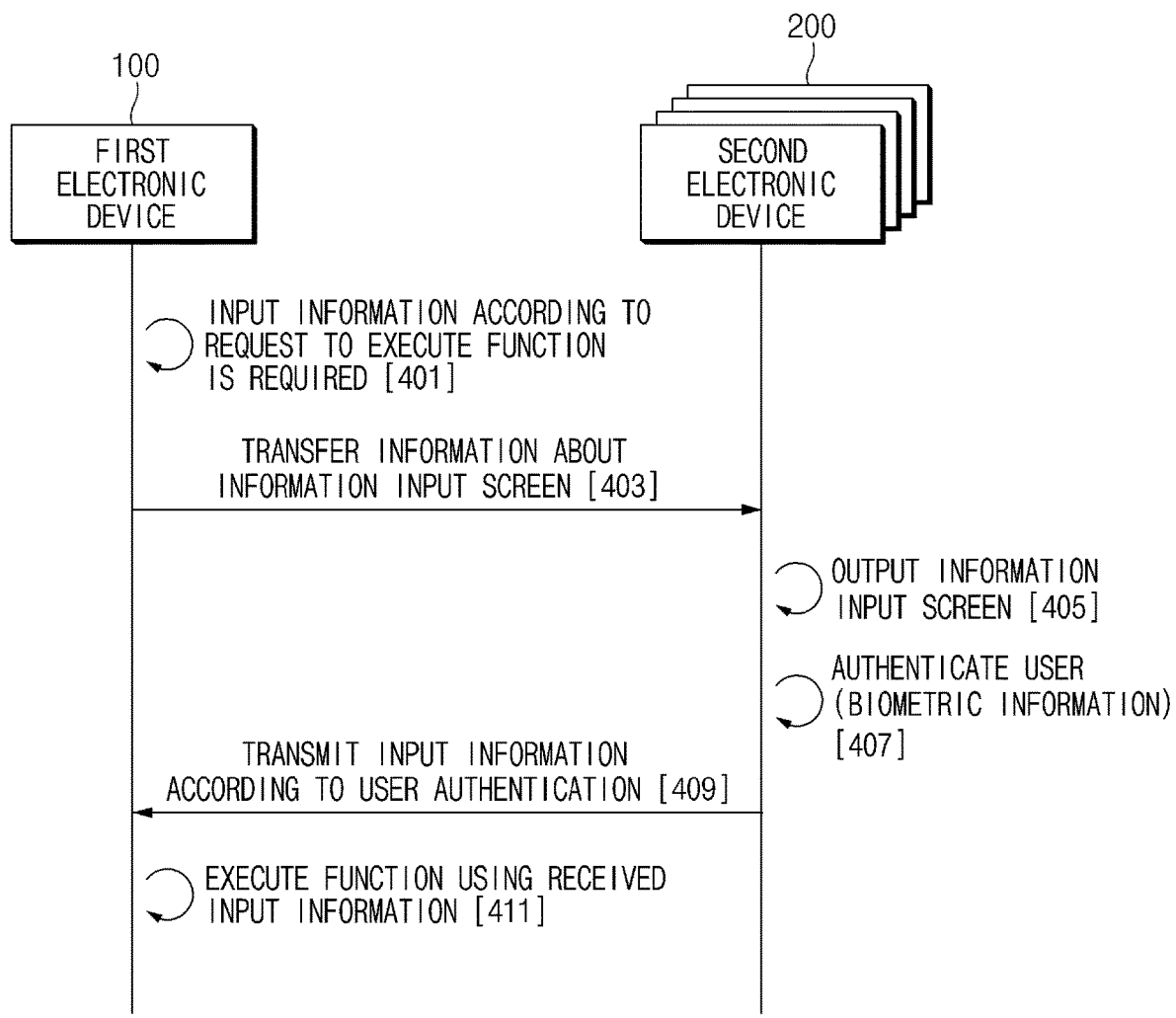
FIG. 4 is a view illustrating another example of a signal flow between components of the system associated with providing an autofill function according to certain embodiments.

FIG. 4 is a view illustrating another example of a signal flow between components of the system associated with providing an autofill function according to certain embodiments.

Referring to FIG. 4, with regard to the autofill function, in operation 401, the first processor 160 of the first electronic device 100 may receive a request for input information (e.g., authentication information) according to a request to execute an app. For example, the first processor 160 may receive a webpage from a specific server accessed via the Internet, and may receive a request to log in to the webpage. In this case, the first processor 160 may receive an information input screen (e.g., a login information request screen) from the specific server. In another example, the first processor 160 of the first electronic device 100 may output an information input screen (e.g., an authentication screen) in relation to execution of a specific app or access to a webpage.

In operation 403, the first processor 160 may transfer the information input screen to the second electronic device 200. In this operation, the first processor 160 may transmit app identification information or URL information together with the information input screen to the second electronic device 200. With regard to detecting another electronic device for transmission of the information input screen, the first processor 160 may execute a scan using on a communication module to discover the second electronic device 200, and may transmit the information input screen to the second electronic device 200 when it is found. For example, the first processor 160 may output, on the first display 150, a list of second electronic devices discovered through scanning and may transmit the information input screen (e.g., a screen for requesting authentication) to a second electronic device as selected by a user input.

In operation 405, the second processor 260 of the second electronic device 200 may output, on the second display 250, a screen based on a request to execute a function (or a request to execute an app). For example, when receiving the information input screen from the first electronic device 100, the second processor 260 may execute the app relevant to the received information input screen and may output the information input screen on the second display 250, according to the execution of the app by the second processor 260. In another example, based on a URL relevant to an authentication screen, the second processor 260 may receive a corresponding webpage from a server. The webpage may be a screen relevant to the information input screen received from the first electronic device 100. The second processor 260 may output the received information input screen (e.g., a login screen) on the second display 250. In another example, the second processor 260 may perform authentication to determine whether to transmit the input information utilized for the information input screen of the first electronic device 100. In this regard, the second processor 260 may output a login screen for the authentication in operation 405, and when user login is performed in operation 407, the second processor 260 may, in operation 409, provide the input information utilized for the information input screen received from the first electronic device 100 (e.g., information that is stored in the second memory 240 in advance and that is to be used for the autofill function on the information input screen of the first electronic device 100) to the first electronic device 100.

In operation 407, the second processor 260 may collect authentication information using the second input device 220. For example, the second processor 260 may output a login screen, and may detect a key input relevant to generating login information. In another example, the second processor 260 may output guide information relevant to the user authentication (e.g., information for requesting a biometric information input such as a fingerprint input or an iris input) and may activate the corresponding sensor 270. The second processor 260 may collect biometric information from a user, based on the activated sensor 270. According to an embodiment, the second processor 260 may output, on the second display 250, a guide message requesting entry of a fingerprint for authentication, and may obtain fingerprint information as authentication information.

In operation 409, the second electronic device 200 may transmit input information according to the user authentication (e.g., authentication information obtained when the user authentication is performed) to the first electronic device 100. In this operation, the second electronic device 200 may encrypt the input information and may transmit the encrypted input information to the first electronic device 100. In another example, the second electronic device 200 may impose a restriction on the input information such that the input information is used within a specified number of times or within a specified period of time. Thereafter, the second electronic device 200 may transmit the input information, the usability of which is restricted, to the first electronic device 100. In another example, after transmitting the input information, the second electronic device 200 may transmit, to the first electronic device 100, information to request that the corresponding input information is used within a specified period of time or within a specified number of times.

In operation 411, the first processor 160 may process execution of a specified app by using the received input information based on successful authentication. For example, the first processor 160 may complete app authentication and may output, on the first display 150, an execution screen according to the completion of the authentication. In another example, the first processor 160 may provide the authentication information to a server, may receive a webpage according to the completion of the authentication from the server, and may output the received webpage on the first display 150.

Figure 5:
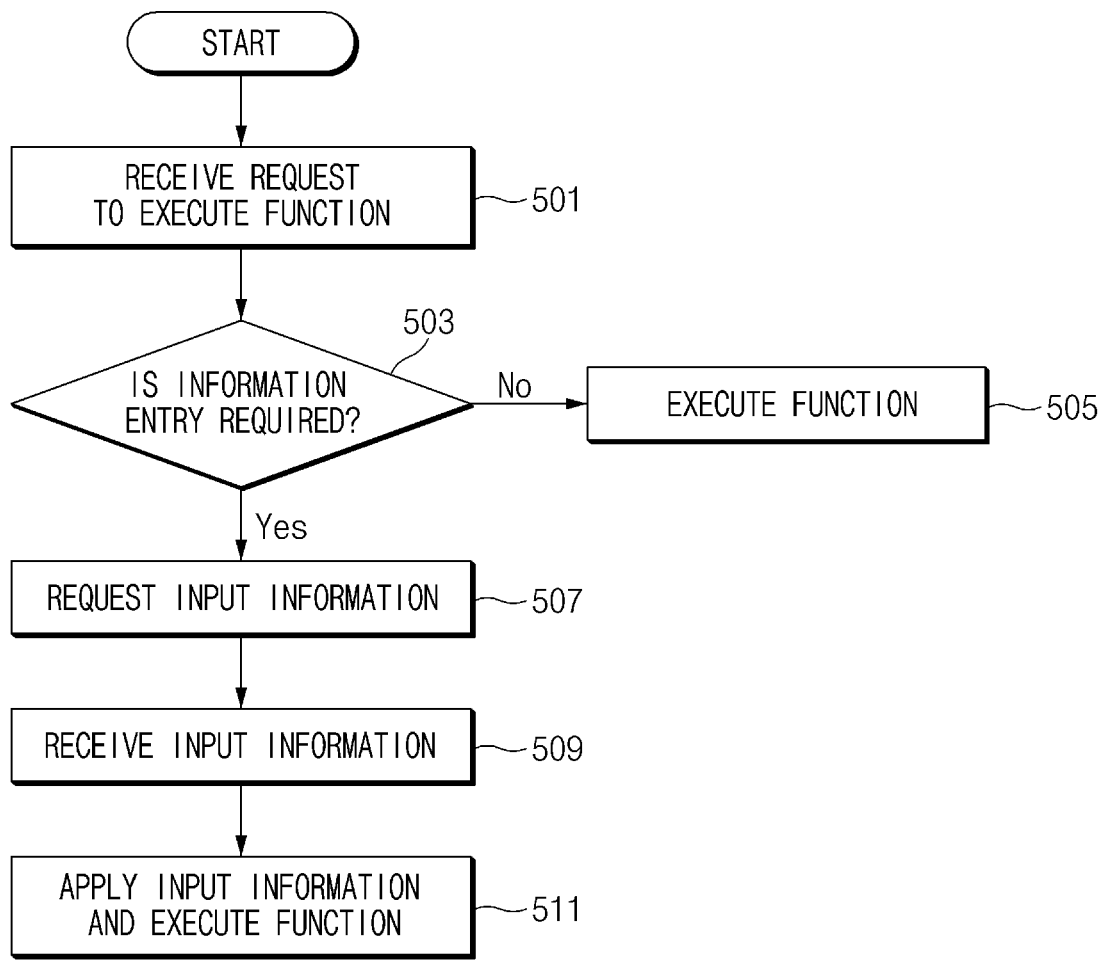
FIG. 5 is a view illustrating an example of an operating method of a first electronic device related to an autofill function according to certain embodiments.

FIG. 5 is a view illustrating an example of an operating method of the first electronic device related to an autofill function according to certain embodiments.

Referring to FIG. 5, with regard to the operating method of the first electronic device 100 according to certain embodiments, in operation 501, the first processor 160 of the first electronic device 100 may receive a request to execute a function. For example, the first processor 160 may connect to a specific server according to a user input and may receive a webpage provided by the server. In another example, the first processor 160 may receive a user input relevant to a menu selection or an icon selection that is associated with execution of an app. In another example, the first processor 160 may receive a request to execute a specified app, according to schedule settings or scheduling.

In operation 503, the first processor 160 may determine whether authentication information entry is associated with access of the requested function. For example, the first processor 160 may identify URL information and may determine whether login is utilized for access to the corresponding webpage. In another example, the first processor 160 may determine whether user authentication is utilized for execution of a requested app, based on the app's corresponding identification information. In this operation, the first processor 160 may output, on the first display 150, information input screen relevant to the execution of the app (e.g., a login screen).

When it is determined that the information entry is not utilized, the first processor 160 may, in operation 505, execute the corresponding function and output a screen according to the execution of the function on the first display 150. For example, the first display 150 may output a webpage provided by a specific server, or may output an execution screen of a specific app.

When it is determined that the authentication information entry is utilized, the first processor 160 may, in operation 507, request input information (e.g., authentication information). In this regard, the first processor 160 may execute a scan to detect other communicable electronic devices, and may transmit an input information request message to a second electronic device discovered by the scan. In another example, the first processor 160 may transmit the input information request message to at least one second electronic device 200 already connected with the first electronic device 100 through an established communication channel. In this operation, the first processor 160 may output, on the first display 150, a list including second electronic devices 200 connected through communication channels or second electronic devices 200 capable of communication connection (e.g., second electronic devices found through scanning), and may transmit the authentication information request message to a second electronic device 200 as selected by a user input. In another example, the first processor 160 may transmit the input information request message (e.g., in the manner of multicast or broadcast) to at least one second electronic device 200 connected with the first electronic device 100 or second electronic devices 200 capable of communication connection.

In operation 509, the first processor 160 may receive the input information from at least one second electronic device 200. In this operation, when no input information is received within a specified period of time, the first processor 160 may output a message indicating a failure to obtain the input information, and may output a prompt requesting direct information entry. In another example, when no input information is received within a specified period of time, the first processor 160 may output, on the first display 50, a message requesting connection with a second electronic device 200 capable of providing input information. In this regard, the first processor 160 may identify an input information reception history and may collect identification information of a second electronic device 200 that has a history of having provided input information relevant to the function or app that is desired to be currently executed. The first processor 160 may output, on the first display 150, the identification information of the second electronic device 200 having the history of having provided the input information, based on the collected identification information. The first processor 160 may perform a scanning operation for a specified period of time, and when the second electronic device 200 that has the history of having provided the input information approaches a coverage area, the first processor 160 may establish a communication channel with the second electronic device 200 having the history of having provided the input information. The first processor 160 may transmit an input information request message to the second electronic device 200 having the history of having provided the input information, based on the communication channel and may receive input information (e.g., authentication information) that corresponds to the input information request message. In another example, the first processor 160 may output the input information request message in the manner of broadcast for a specified period of time and may wait to receive a response message (e.g., a message including input information) that corresponds to the input information request message.

When the input information is received from the at least one second electronic device 200, the first processor 160 may, in operation 511, input the received input information into the relevant fields, and process the execution of the function. For example, the first processor 160 may enter received authentication information into the fields of a login screen by using the autofill function (e.g., or in an automatic manner). The first processor 160 may perform authentication in response to a user input for requesting confirmation of authentication. When the authentication fails, the first processor 160 may output a message regarding the failure in the authentication and may output an authentication information editing screen. In another example, in the state of receiving a plurality of pieces of authentication information, the first processor 160 may perform authentication based on specified authentication information or specific authentication information. When the authentication fails, the first processor 160 may output a screen for selecting any one of the plurality of pieces of authentication information received. In this operation, the first processor 160 may deactivate the authentication information by which the authentication fails, or may remove the authentication information from the list that includes the plurality of pieces of authentication information.

In operation 507 described above, according to an embodiment, the first processor 160 may identify an input information reception history before transmitting the input information request message and may transmit the input information request message to a specified second electronic device 200 or may transmit the input information request message toward at least one second electronic device 200 located nearby through broadcast. In another example, before transmitting the input information request message, the first processor 160 may identify an input information reception history. In the case where there is history information of a second electronic device 200 from which input information relevant to the function or app that is requested to be executed at present was received, the first processor 160 may attempt communication connection with the second electronic device 200. When a communication channel with the second electronic device 200 is established, the first processor 160 may transmit the input information request message to the second electronic device 200 communicatively connected thereto. In this operation, when the communication connection with the second electronic device 200 fails, the first processor 160 may guide the failure in the communication connection and may attempt communication connection with the second electronic device 200 again according to a user input or may repeatedly transmit the input information request message in the manner of broadcast every predetermined period or for a predetermined number of times.

In operation 509 described above, according to an embodiment, when receiving a plurality of pieces of input information, the first processor 160 may generate a list based on identification information of second electronic devices 200 that provide the plurality of pieces of input information, and may output the generated list. Accordingly, in operation 511, the first processor 160 may process the function (e.g., authentication), based on input information of an item selected by a user input.

Figure 6:
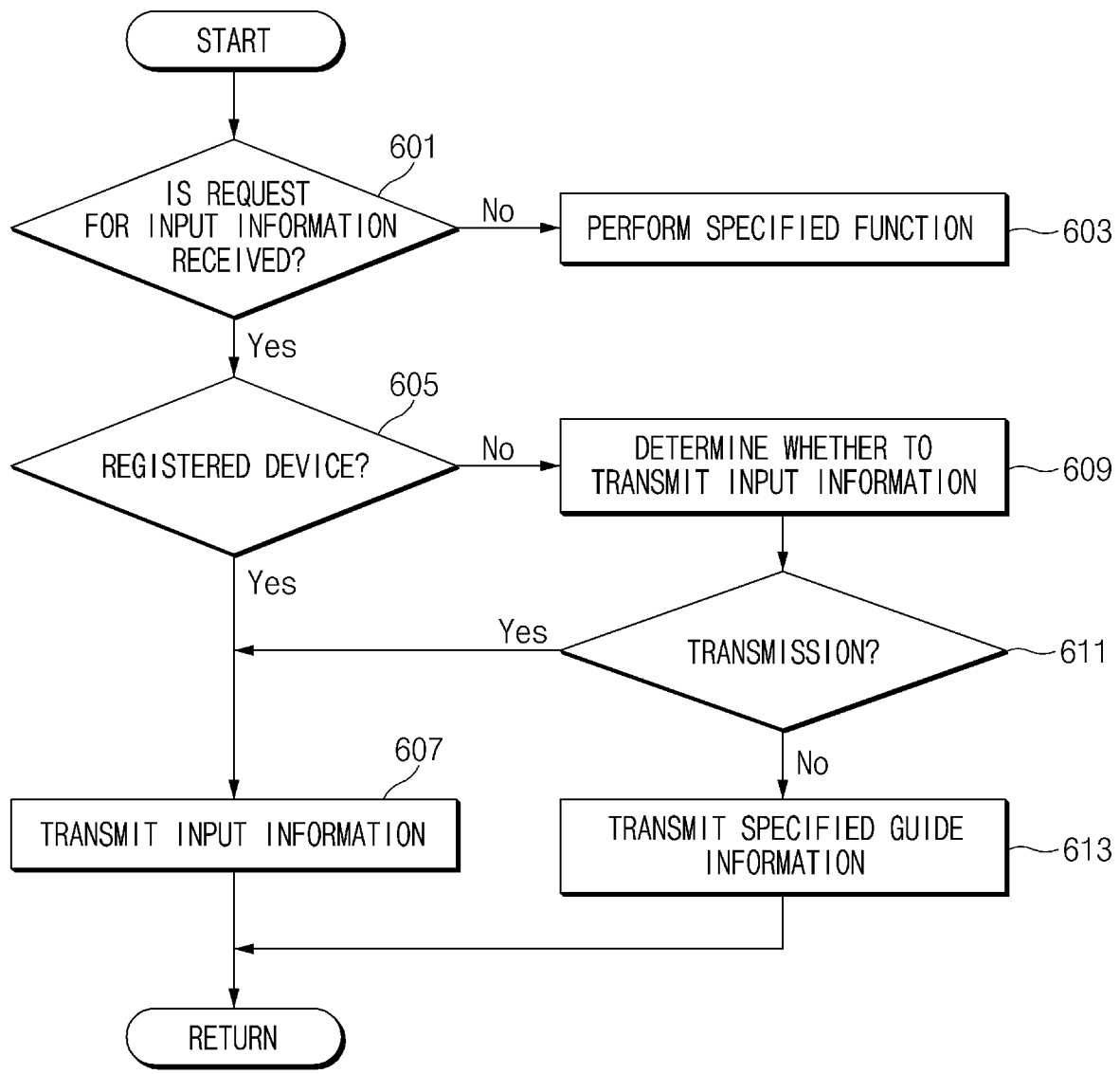
FIG. 6 is a view illustrating an example of an operating method of a second electronic device related to an autofill function according to certain embodiments.

FIG. 6 is a view illustrating an example of an operating method of the second electronic device related to an autofill function according to certain embodiments.

Referring to FIG. 6, with regard to the operating method of the second electronic device related to the autofill function, in operation 601, the second processor 260 of the second electronic device 200 may determine whether a request for input information (e.g., a request for authentication information) is received. The request for the input information may include a message that the first electronic device 100 transmits in the manner of broadcast or through a set communication channel. The request for the input information may include identification information of the first electronic device 100. When it is determined that the request for the input information is not received, the second processor 260 may, in operation 603, perform a specified function. For example, the second processor 260 may output a specific webpage according to a user input, or may execute a specific app.

When it is determined that the request for the input information is received, the second processor 260 may, in operation 605, determine whether the device that requests the input information is a specified registered device. In this regard, the second processor 260 may store and manage a transmission/reception history of the input information. The transmission/reception history may include identification information or connection information of an electronic device which has historically provided the input information. The second processor 260 may identify transmission/reception history information stored in the second memory 240 and determine whether the device to which the input information is to be provided is the electronic device registered in the transmission/reception history. When it is determined that the device to which the input information is to be provided is the registered device, the second processor 260 may, in operation 607, transmit the input information to the electronic device (e.g., the first electronic device 100) that requests the input information.

When it is determined in operation 605 that the device to which the input information is to be provided is not the registered device, the second processor 260 may, in operation 609, generate a request to determine whether to transmit the input information. For example, the second processor 260 may output a screen including a virtual selection button for prompting confirmation as to whether to transmit the input information to the device (e.g., the first electronic device 100). In another example, the second processor 260 may output a popup window to prompt confirmation as to whether to transmit the input information.

In operation 611, the second processor 260 may determine whether a user input confirming transmission of the input information is detected. When the confirmation is detected, the second processor 260 may proceed to operation 607 and transmit the input information. When confirmation is not detected or outright rejected, the second processor 260 may, in operation 613, transmit specified guide information to the electronic device that requested the input information. In another example, the second processor 260 may terminate output of a screen relevant to the transmission of the input information. Thereafter, the second processor 260 may return to operation 601 and may perform the subsequent operations again.

According to the certain embodiments described above, an electronic device according to an embodiment (e.g., the second electronic device 200 of FIG. 2) may include communication circuitry (e.g., the second communication circuitry 210 of FIG. 2) that communicate with an external electronic device (e.g., the first electronic device 100 of FIG. 2), a memory (e.g., the second memory 240 of FIG. 2) that stores input information (e.g., autofill information including authentication information), and a processor (e.g., the second processor 260 of FIG. 2) that is operatively connected with the communication circuitry and the memory. When receiving, from the external electronic device (e.g., the first electronic device 100 of FIG. 2), an input information request message for requesting input information that is to be entered on an information input screen, which is relevant to execution of an app, based on an autofill function, the processor may detect the input information stored in the memory, in response to the receipt of the input information request message and may transmit the detected input information to the external electronic device.

According to certain embodiments, the processor (e.g., the second processor 260 of FIG. 2) may identify identification information of the external electronic device (or connection information of the external electronic device) and may automatically transmit the input information when the external electronic device is a specified device.

According to certain embodiments, when the external electronic device is not the specified device, the processor (e.g., the second processor 260 of FIG. 2) may output an approval request relevant to the transmission of the input information (e.g., a screen such as a popup window or a confirmation window for obtaining approval for the transmission of the input information) on a display (e.g., the second display 250) and may transmit the input information to the external electronic device according to a user input.

Figure 7:
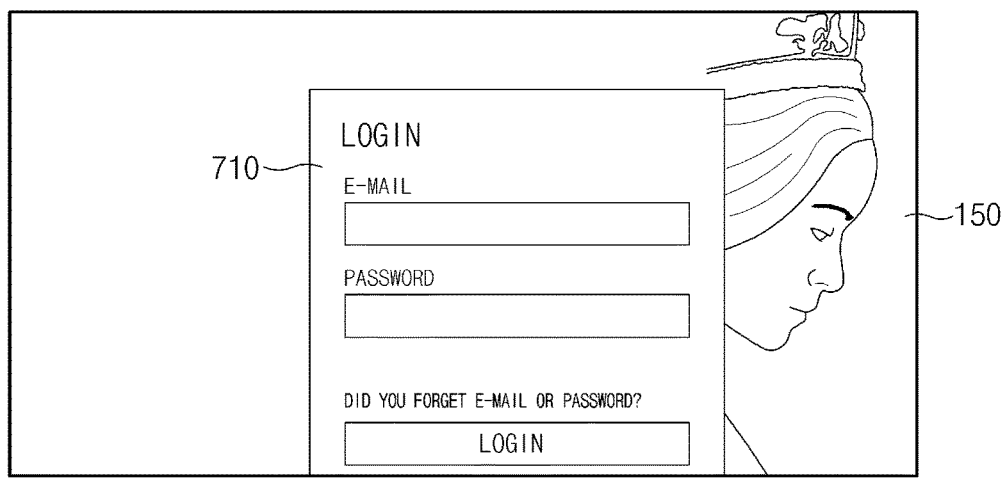
FIG. 7 is a view illustrating an example of a screen interface related to an autofill function according to certain embodiments.
Figure 7:
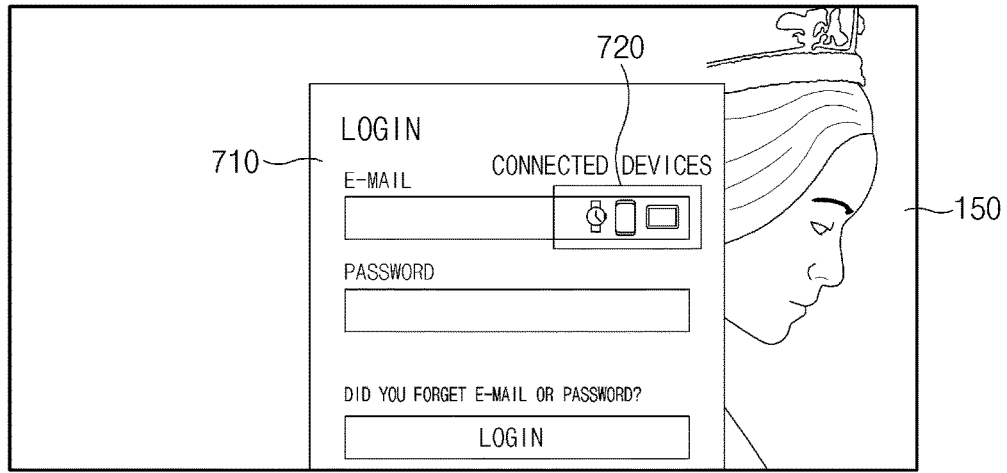
Figure 7:
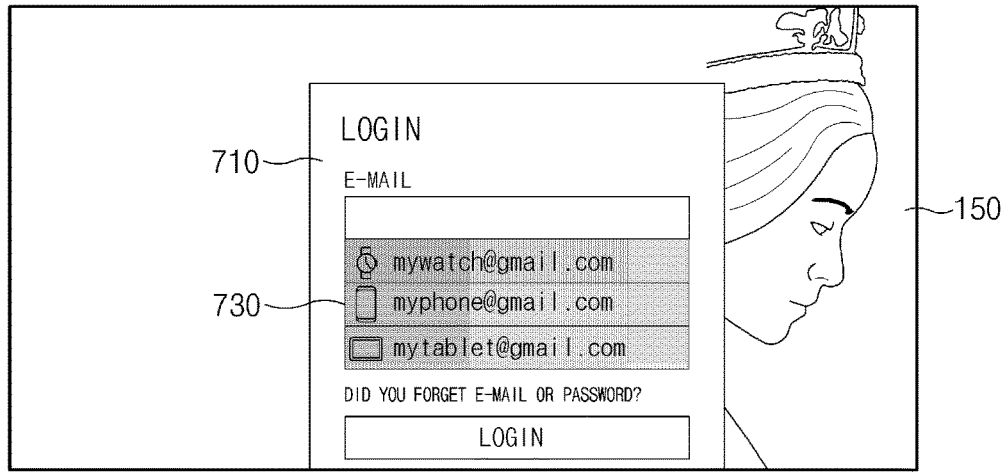

FIG. 7 is a view illustrating an example of a screen interface related to an autofill function according to certain embodiments.

Referring to FIG. 7, with regard to the screen interface related to the autofill function, as shown on screen 701, the first electronic device 100 may output a screen including an information input window, such as, for example, a login input window 710 on the first display 150. In this regard, the first electronic device 100 may output an app selection screen including the login input window 710. When a user selects a specific app, the first electronic device 100, as shown on screen 701, may output the screen including the information input window (e.g., the login input window 710) relevant to execution of the app. In another example, when an event including a login input occurs (e.g., executing some application or content which requests a login for application or server access), the first electronic device 100 may output the login input window 710 on the first display 150 as illustrated.

The information input window relevant to the execution of the app may be, for example, a window including one or more input fields for entering user information, payment card or other payment information, or voice authentication. For example, the first electronic device 100 may include, for example, a television (TV), and the second electronic device may include, for example, a smartphone, a tablet PC, an AI speaker, or a smart watch. The first electronic device 100 may connect with an external electronic device (e.g., at least one second electronic device) in a wired/wireless manner or through Bluetooth or Zigbee. In another example, the first electronic device 100 may be connected with the external electronic device through WiFi, WiFi direct, the same commercial network, or USB connection. FIG. 7 illustrates an example in which a package name representing the specific app according to the execution of the corresponding app and a login screen (or the login input window 710) on which a user input is entered in an ID input field or a password input field are output on the first electronic device 100 that is a TV device.

When the login input window 710 is output, as shown on screen 703, the first electronic device 100 may output, on the first display 150, a list 720 of second electronic devices that capable of connecting, or are already connected, with the first electronic device 100. In another example, the first electronic device 100 may execute scanning for available devices using a communication module, and output the list 720 indicating any discovered second electronic devices. For example, as illustrated, the list 720 may include icons or images representing the second electronic devices. When selection of a specific item included in the list 720 is detected, the first electronic device 100 may request input information (e.g., or authentication information to be entered by using the autofill function) from the second electronic device corresponding to the relevant item. In another example, the first electronic device 100 may transmit an input information request message to the second electronic devices included in the list 720. According to certain embodiments, the first electronic device 100 may highlight an electronic device having the desired input information, as indicated in a service history relevant to the app that is being executed at present. In an embodiment, the first electronic device 100 may automatically transmit the input information request message to the highlighted second electronic device. Although the list 720 is displayed in the area of the login input window 710, the disclosure is not limited thereto. The list 720 may be output in a different area or in a separate window.

According to certain embodiments, when focus is on the information input window (e.g., the login input window 710) (e.g., when a pointer is on the login input window 710 or a touch input closely approaches or touches the login input window 710), the first electronic device 100 may request input information for autofill from the second electronic device 200. In response to the request of the first electronic device 100 for the input information, the second electronic device 200 may output a screen for inquiring whether to approve transmission of input information stored in the second memory. When a user input according to approval for the transmission occurs or the transmission is allowed by default, the second electronic device 200 may transmit the corresponding input information to the first electronic device 100. The first electronic device 100 may output information on the information input window (e.g., the login input window 710) according to the autofill function by using the input information received from the second electronic device 200.

According to certain embodiments, when a new external electronic device having no previous connection history is connected, the first electronic device 100 may output information (e.g., an image or text) that indicates that the new external electronic device is a new device, and may perform connection to an external electronic device that has a connection history or for which user authentication is performed in advance. In the case where a plurality of external electronic devices are connected as described above, the first electronic device 100 may display the external electronic devices and may wait for a user input. The first electronic device 100 may provide a UI for blocking a specific external electronic device and may prevent unnecessary information from being transferred from an external electronic device that a user operating the first electronic device 100 does not want.

The first electronic device 100 may provide UIs for connection methods of external electronic devices connected thereto. For example, the first electronic device 100 may display a WiFi logo, a WiFi direct logo, or a Bluetooth logo according to the methods by which the first electronic device 100 is connected with the external electronic devices. In the case where the first electronic device 100 has a display, the first electronic device 100 may output information through the display, and in the case where the first electronic device 100 has no display, the first electronic device 100 may establish a communication channel with a surrounding device having a display and may perform control to output a screen relevant to operation of the autofill function. In another example, the first electronic device 100 may output progress information relevant to operation of the autofill function through a specific sound or vibration.

According to certain embodiments, in an operation of displaying an input information list 730, the first electronic device 100 may display at least one of the name of an external electronic device, a user name, or an icon indicating the external electronic device. When requesting input information, the first electronic device 100 may convert and transmit the request to conform to a corresponding electronic device format according to the type of connected external electronic device (e.g., a smartphone, a tablet PC, or an AI speaker).

According to certain embodiments, in an input standby state on a website screen according to execution of a web browser, the first electronic device 100 may transmit the URL of the corresponding website to an external electronic device. In another example, the first electronic device 100 may provide, to the external electronic device, a component name indicating the type of area (or input field) in which input information is entered through the autofill function. The component may include, for example, the ID of a specific tag, a class name, or a distinguishable attribute value in an HTML code. The first electronic device 100 may transmit, to the external electronic device, the entire webpage contents that are being output on the first display 150.

According to certain embodiments, when the input information is received in response to the request for the input information, as shown on screen 705, the first electronic device 100 may output the received input information list 730 on the first display 150. The input information list 730 may include input information that a plurality of second electronic devices provide in response to the request for the input information. The input information list 730 may include at least some of images (or icons) and texts by which the second electronic devices are identified. Although it is exemplified that the input information list 730 is displayed in a predetermined area of the login input window 710, the disclosure is not limited thereto. For example, the login input window 710 may be output as a separate window, or may be output in a different area of the first display 150. The displayed input information list 730 is aimed at identifying the second electronic devices, and actual input information may be encrypted and temporarily stored in the first memory 140. The input information temporarily stored in the first memory 140 may be automatically deleted after used for authentication of the app that is being executed at present.

According to certain embodiments, a plurality of second electronic devices may be wiredly/wirelessly connected to the first electronic device 100, and the first electronic device 100 may transfer the current screen information to the plurality of second electronic devices. The plurality of second electronic devices may determine whether there is input information that is to be entered through the autofill function in response to the current screen of the first electronic device 100, and at least one second electronic device may transmit, to the first electronic device 100, input information that is to be entered through the autofill function.

Figure 8:
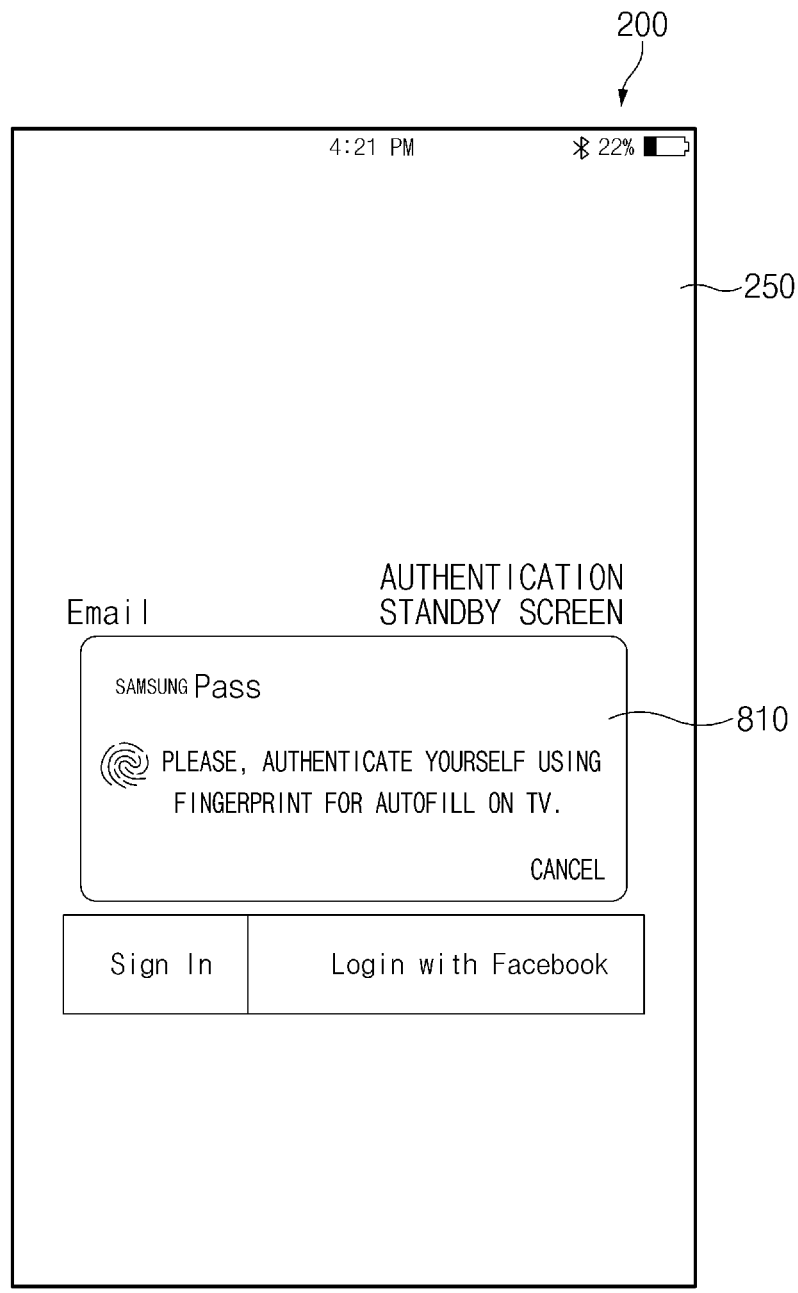
FIG. 8 is a view illustrating another example of a screen interface related to an autofill function according to certain embodiments.

FIG. 8 is a view illustrating another example of a screen interface related to an autofill function according to certain embodiments.

Referring to FIG. 8, with regard to the autofill function, the first electronic device 100 (e.g., a TV device) may transmit an authentication screen information relevant to authentication to the second electronic device 200 when the first electronic device 100 executes an app utilizing authentication, or accesses a webpage utilizing authentication according to access to a server. When receiving the authentication screen information from the first electronic device 100, the second electronic device 200 may extract app identification information from the authentication screen information, and may execute the corresponding app, or may obtain URL information to connect to the corresponding server and may output an authentication screen utilizing authentication on the second display 250.

In this operation, the second electronic device 200 may output, on the second display 250, information indicating the execution of the app in the first electronic device 100 or the execution of the webpage utilizing authentication, together with authentication request information. For example, as illustrated, the second electronic device 200 may output guide information 810 prompting entry of fingerprint information for authentication in the first electronic device 100. The second electronic device 200 may activate a fingerprint sensor, with the output of the guide information 810 and may output guide information to lead a user to input a fingerprint. The second electronic device 200, when obtaining fingerprint information, may provide the corresponding fingerprint information to the first electronic device 100.

According to certain embodiments, the second electronic device 200 may include an autofill management app to obtain input information for autofill. The autofill management app may determine whether there is a stored value relevant to a raw data set of an authentication information request message received from the first electronic device 100 and may obtain the corresponding data when the relevant stored value exists. Alternatively, the autofill management app may obtain a result value (e.g., a value when login is normally performed) that is obtained by performing simulation (e.g., entering at least one ID and password) by using the raw data (e.g., a login input window) of the authentication information request message, or may obtain a user input.

According to certain embodiments, the autofill management app may execute, in the second electronic device 200, a specified app that is the same as the app being executed in the first electronic device 100 and may obtain and transmit, to the first electronic device 100, a result value (e.g., input information that has to be entered to execute the specified app) that is applied to the specified app. For example, with regard to the raw data simulation, when information relevant to a URL and a specific input form is included in the raw data, the second electronic device 200 may load the data into a web browser of the second electronic device 200, and when being in a user input standby state with focus on the specific input form, the second electronic device 200 may return information given by the web browser to the first electronic device 100 without change. This method may be very useful when a webpage not subordinate to a device platform is given.

According to certain embodiments, the second electronic device 200 may transfer, to the first electronic device 100, at least one of a voice data input obtained by the second electronic device 200, a voice input for text entry, or input information obtained through photographing for face recognition.

According to certain embodiments, the second electronic device 200 may output, on a screen, a plurality of pieces of input information stored in the second memory 240 and may transmit input information according to a user selection to the first electronic device 100. In this operation, the second electronic device 200 may select specific input information by default (or automatically) according to a previous history of having provided information to the first electronic device 100, and may transmit the selected specific input information to the first electronic device 100.

Figure 9:
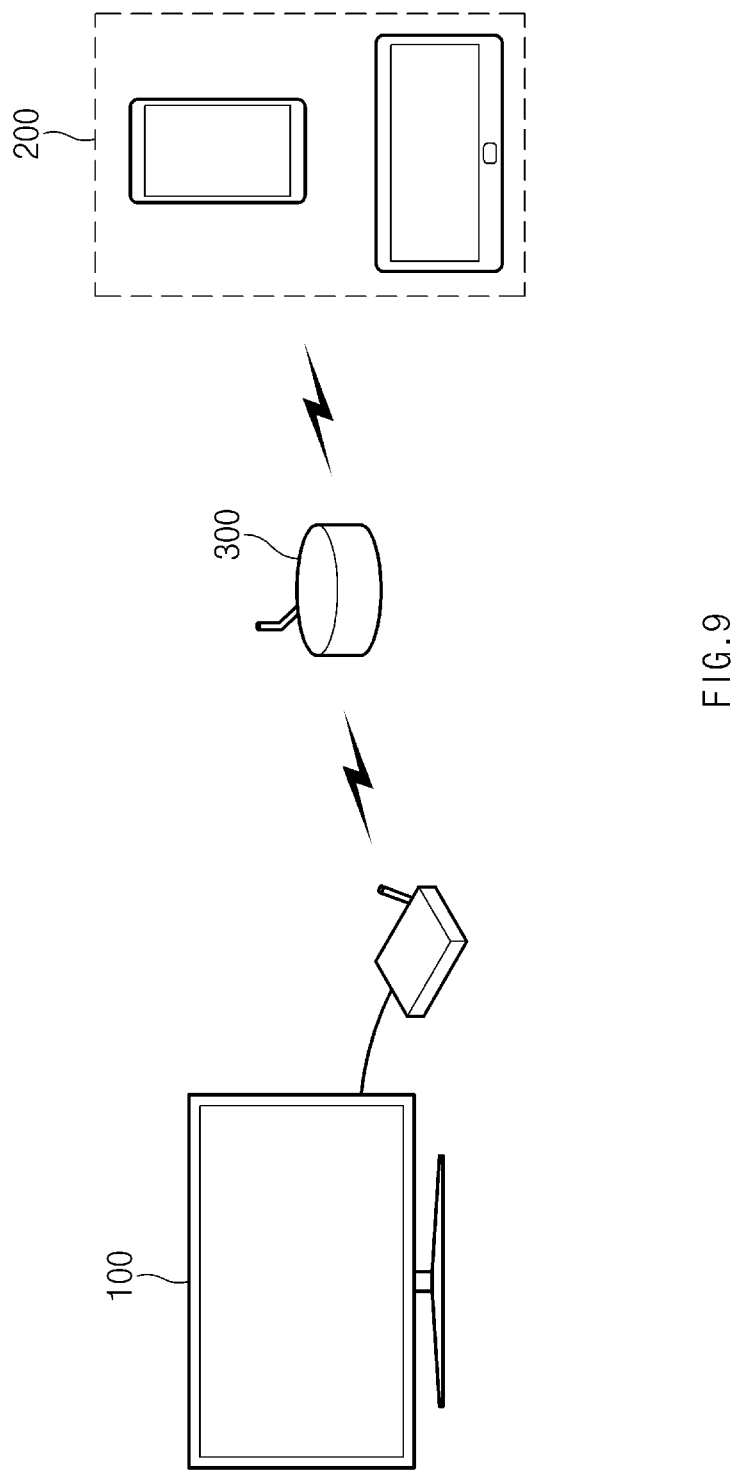
FIG. 9 is a view illustrating another example of an environment to which an autofill function is applied according to certain embodiments.

FIG. 9 is a view illustrating another example of an environment to which an autofill function is applied according to certain embodiments.

Referring to FIG. 9, the environment relevant to the autofill function may include the first electronic device 100, a hub device 300, and/or the second electronic device 200.

The first electronic device 100 may be a device that outputs an input window relevant to the autofill function. When an app or a specific webpage to which the autofill function is applied is executed, the first electronic device 100 may request input information for autofill from the hub device 300 that is connected thereto through a communication channel (or a wired communication channel).

When receiving the request for the input information, the hub device 300 may identify the app or the specific webpage requested to be executed in the first electronic device 100 and may search for the second electronic device 200 that is capable of providing the input information utilized for the first electronic device 100. The hub device 300 may transfer the request for the input information to the found second electronic device 200, and when receiving the input information from the second electronic device 200, the hub device 300 may transfer the input information to the first electronic device 100. In this regard, the hub device 300 may store and manage histories of the first electronic device 100 and at least one second electronic device 200 that are associated with providing the input information. In this regard, the hub device 300 may include communication circuitry 310 for communication with at least one external electronic device and a processor 360. With regard to the request for the input information, the communication circuitry 310 of the hub device 300 may establish a communication channel with at least one of the first electronic device 100 or the second electronic device 200. For the transfer of the input information utilized for the first electronic device 100, the processor 360 of the hub device 300 may search for the second electronic device 200 and may receive and transfer the input information. The hub device 300 may further include a memory for storing data or a program in relation to the above-described operation control.

When receiving the request for the input information from the hub device 300, the second electronic device 200 may identify the app or the specific webpage, may extract, from the second memory 240, input information to be provided to the corresponding app or the specific webpage, and may transmit the extracted input information to the hub device 300.

Although it has been described that the hub device 300 performs the device search for the transfer of the input information and the collection and transfer of the input information between the first electronic device 100 and the second electronic device 200, the disclosure is not limited thereto. For example, the hub device 300 may not search for the second electronic device 200 capable of providing separate input information, may output an input information request message in the manner of broadcast when receiving the request for the input information from the first electronic device 100, and may relay at least one response message to the first electronic device 100 when at least one second electronic device 200 provides the response message.

As described above, the devices and methods for providing the autofill function according to the certain embodiments may support more easily and rapidly processing information entry in an operation of entering information on a screen by devices that have no input device or that have a more unfamiliar and inconvenient input method than a PC or a mobile device.

Furthermore, the devices and methods for providing the autofill function according to the certain embodiments do not use information of a cloud server and therefore may support using an auto login function or a function of automatically pre-filling a form, without management of an account for each device or the information of the cloud server and may provide a more stable environment in terms of security than when authentication information is stored and operated in a separate network server.

In addition, the devices and methods for providing the autofill function according to the certain embodiments may support easily identifying and selecting information of electronic devices even in a situation in which the electronic devices are connected to one device, thereby improving usefulness even in an environment of an electronic device (e.g., TV) that is used in common.

The certain embodiments of the disclosure may provide an autofill function support system that includes the first electronic device 100 and the second electronic device 200. In the autofill function support system, the first electronic device 100, when receiving a request to execute an app, may output an information input screen relevant to the execution of the app on the display, may make a request for at least one piece of input information that is to be entered on the information input screen based on the autofill function, to the second electronic device 200 through the communication circuitry, and may apply the at least one piece of input information to a function of the app when receiving the at least one piece of input information from the second electronic device 200, and the second electronic device 200, when receiving an input information request message from the first electronic device 100, may transmit input information stored or entered through an input device to the first electronic device 100.

According to certain embodiments, the information input screen may include an authentication screen relevant to user authentication, and the input information may include authentication information utilized for the user authentication.

According to certain embodiments, an electronic device (e.g., the first electronic device 100 of FIG. 2) according to an embodiment may include communication circuitry (e.g., the first communication circuitry 110 of FIG. 2), a memory (e.g., the first memory 140 of FIG. 2) that stores at least one application, a display (e.g., the first display 150 of FIG. 2), and a processor (e.g., the first processor 160 of FIG. 2) that is operatively connected with the memory (e.g., the first memory 140 of FIG. 2) and the display (e.g., the first display 150 of FIG. 2). The processor 160 may be configured to output an information input screen (e.g., the login input window 710 of FIG. 7) relevant to execution of an application on the display 150 when receiving a request to execute the application, receive at least one piece of input information to be entered on the information input screen, from an external electronic device (e.g., the second electronic device 200 of FIG. 2) via the communication circuitry (e.g., the first communication circuitry 110 of FIG. 2), and automatically enter the at least one piece of input information on the information input screen.

According to certain embodiments, the information input screen may include an authentication screen relevant to user authentication.

According to certain embodiments, the input information may include authentication information utilized for the user authentication.

According to certain embodiments, the processor (e.g., the first processor 160 of FIG. 2) may be configured to identify an input information transmission/reception history stored in the memory and transmit a request message for requesting the input information to one or more external electronic devices registered in the input information transmission/reception history.

According to certain embodiments, the processor (e.g., the first processor 160 of FIG. 2) may be configured to transmit the request message to an external electronic device having a history of having provided input information relevant to the application requested to be executed at present, among the one or more external electronic devices registered in the input information transmission/reception history.

According to certain embodiments, the processor (e.g., the first processor 160 of FIG. 2) may be configured to identify an input information transmission/reception history stored in the memory 140, output a list of one or more external electronic devices registered in the input information transmission/reception history, and display a specific external electronic device differently from other items, the specific external electronic device having transmitted/received input information relevant to the application requested to be executed at present.

According to certain embodiments, the processor (e.g., the first processor 160 of FIG. 2) may be configured to perform scanning based on the communication circuitry 110 and transmit a request message for requesting the input information to one or more external electronic devices that are able to be connected, or are connected, with the electronic device.

According to certain embodiments, the processor (e.g., the first processor 160 of FIG. 2) may be configured to transmit a request message for requesting the input information, in a manner of broadcast based on the communication circuitry 110.

According to certain embodiments, the processor (e.g., the first processor 160 of FIG. 2) may be configured to receive a plurality of pieces of input information from a plurality of external electronic devices, respectively, and output a list from which one of the plurality of pieces of input information is selectable.

According to certain embodiments, the processor (e.g., the first processor 160 of FIG. 2) may be configured to generate the list with items including at least one of images or texts by which the plurality of external electronic devices is identified.

According to the certain embodiments described above, a method for providing an autofill function according to an embodiment may include operations executed by a processor of an electronic device, in which the operations may include receiving a request to execute an application (e.g., 501 of FIG. 5), outputting an information input screen relevant to the execution of the application on a display (e.g., 503 of FIG. 5), requesting at least one piece of input information to be entered on the information input screen, from an external electronic device via communication circuitry (e.g., 507 of FIG. 5), receiving the at least one piece of input information, which is to be entered on the information input screen, from the external electronic device via the communication circuitry (e.g., 509 of FIG. 5), and automatically entering the at least one piece of input information on the information input screen (e.g., 511 of FIG. 5).

According to certain embodiments, the method may further include identifying an input information transmission/reception history stored in a memory and transmitting a request message for requesting the input information to one or more external electronic devices registered in the input information transmission/reception history.

According to certain embodiments, the transmitting of the request message may include transmitting the request message to an external electronic device having a history of having provided input information relevant to the application requested to be executed at present, among the one or more external electronic devices registered in the input information transmission/reception history.

According to certain embodiments, the method may further include identifying an input information transmission/reception history stored in a memory, outputting a list of one or more external electronic devices registered in the input information transmission/reception history, and displaying a specific external electronic device differently from other items, the specific external electronic device having transmitted/received input information relevant to the application requested to be executed at present.

According to certain embodiments, the method may further include performing scanning based on the communication circuitry and transmitting a request message for requesting the input information to one or more external electronic devices that are able to be connected, or are connected, with the electronic device.

According to certain embodiments, the method may further include transmitting a request message for requesting the input information, in a manner of broadcast based on the communication circuitry.

According to certain embodiments, the receiving of the at least one piece of input information may include receiving a plurality of pieces of input information from a plurality of external electronic devices, respectively, and outputting a list from which one of the plurality of pieces of input information is selectable.

According to certain embodiments, the outputting of the list may include configuring the list with items including at least one of images or texts by which the plurality of external electronic devices are identified.

According to certain embodiments of the disclosure, an electronic device (e.g., the hub device 300 of FIG. 9) according to an embodiment may include communication circuitry (e.g., the communication circuitry 310 of FIG. 9) that establishes a communication channel to communicate with at least one external electronic device and a processor (e.g., the processor 360 of FIG. 9) that is operatively connected with the communication circuitry. The processor may be configured to receive a request for input information from a first external electronic device (e.g., the first electronic device 100 of FIG. 9), search for a second external electronic device (e.g., the second electronic device 200 of FIG. 9) that provides the input information utilized for the first external electronic device (e.g., the electronic device 100 of FIG. 9), transfer the request for the input information to the found second external electronic device 200, and transmit the input information to the first external electronic device 100 when receiving the input information from the second external electronic device 200.

The processor may be configured to identify an application or a webpage requested to be executed in the first external electronic device 100, when receiving the request for the input information from the first external electronic device 100 and search for the second external electronic device 200 that provides the input information based on the corresponding application or webpage.

Figure 10:
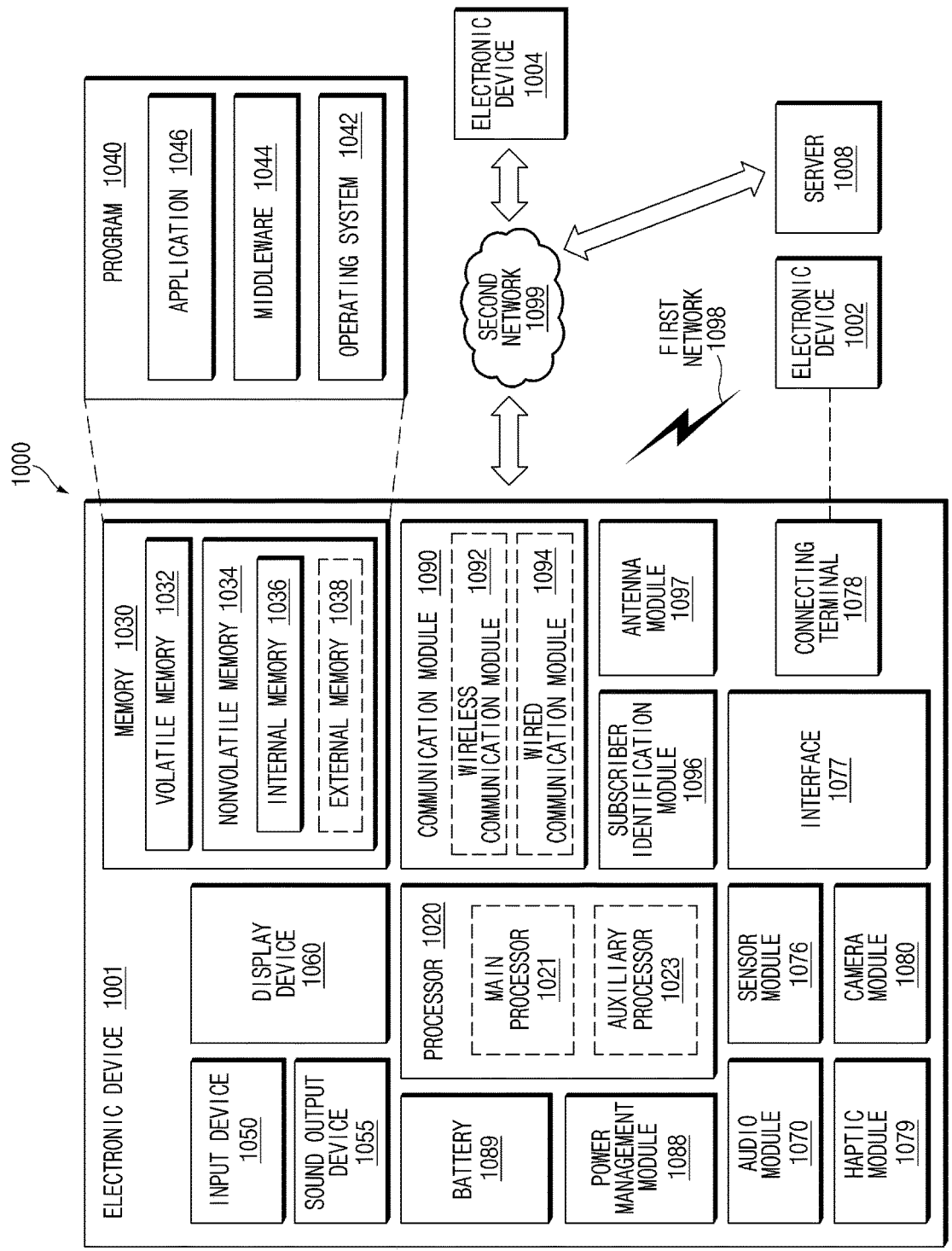
FIG. 10 is a block diagram illustrating an electronic device 1001 in a network environment 1000 according to certain embodiments.

FIG. 10 is a block diagram illustrating an electronic device 1001 in a network environment 1000 according to certain embodiments.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to the embodiments, the disclosure may facilitate the use of an application in an electronic device, by obtaining information stored in an external electronic device or simply obtaining information to be entered into the electronic device by using an input device of the external electronic device.

In addition, the disclosure may provide various effects that are directly or indirectly recognized.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
   a communication circuitry;
   a memory storing an application;
   a display; and
   a processor operatively connected with the communication circuitry, the memory, and the display, wherein the memory includes instructions that, when executed, cause the processor to:
   receive a first user input requesting execution of the application;
   upon receiving the first user input, execute the application, including outputting an information input screen of the executed application on the display, the information input screen including a first region that includes representations of a plurality of external electronic devices;
   receive a second user input selecting a specific external electronic device from among the plurality of external electronic devices;
      upon receiving the second user input, transmit a request message to the specific external electronic device, the request message requesting login information; and
      receive the login information from the specific external electronic device via the communication circuitry; and automatically enter the login information into the information input screen,
      wherein the processor is further configured to: access a login information transmission/reception history, stored in the memory, to identify the plurality of external electronic devices registered in the login information transmission/reception history, wherein the login information transmission/reception history includes identification of a second external device that previously provided the login information for the application.

2. The electronic device of claim 1, wherein the information input screen includes an authentication screen that secures access to the application,
   wherein instructions are further executable to cause the electronic device to:
   based on detecting a selection input to the information input screen, displaying in the information input screen a second region that displays representations of the plurality of external electronic devices, and removing the first region from display, and
   wherein the second user input selecting a second external electronic device is detected to the second region.

3. The electronic device of claim 2, wherein the login information includes authentication information utilized to authenticate a user for access to the application.

4. The electronic device of claim 1,
   wherein the request message is transmitted to the second external device based on the identification.

5. The electronic device of claim 2, wherein the processor is configured to:
   output the second region of the plurality of external electronic devices registered in the login information transmission/reception history on the display; and
   when displaying the second region, visually distinguish the second external electronic device from other items in the second region based on detecting that the second external electronic device previously transmitted and/or received the login information relevant to the application.

6. The electronic device of claim 1, wherein the processor is configured to:
   scan for discoverable external electronic devices using the communication circuitry which are communicatively connectable and/or presently connected to the electronic device;
   detect the discoverable external electronic devices by the scan; and
   transmit a request message requesting login information to the detected discoverable external devices including the specific external electronic device.

7. The electronic device of claim 1, wherein the processor is configured to:
   broadcast a request message requesting the login information using the communication circuitry.

8. The electronic device of claim 1, wherein each external electronic device is visually represented in the first and second regions using at least one of an image or a text.

9. A method for an electronic device, the method comprising:
   receiving, by a processor, a first user input requesting execution of an application;
   upon receiving the first user input, executing the application including outputting an information input screen of the executed application on a display, the information input screen including a first region that includes representations of a plurality of external electronic devices;
   receive a second user input selecting a specific external electronic device from among the plurality of external electronic devices;

upon receiving the second user input, transmit a request message to the specific external electronic device, the request message is requesting login information;

receiving the login information, via communication circuitry, from the specific external electronic device; and automatically entering the login information into the information input screen, wherein the method further comprises: accessing a login information transmission/reception history, stored in a memory, to identify the plurality of external electronic devices registered in the login information transmission/reception history, wherein the login information transmission/reception history includes identification of a second external device that previously provided the login information for the application.

10. The method of claim 9, wherein the information input screen includes an authentication screen that secures access to the application, wherein instructions are further executable to cause the electronic device to:

based on detecting a selection input to the information input screen, displaying in the information input screen a second region that displays representations of the plurality of external electronic devices, and removing the first region from display, and wherein the second user input selecting a second external electronic device is detected to the second region.

11. The method of claim 10, wherein the login information includes authentication information utilized to authenticate a user for access to the application.

12. The method of claim 9,
wherein the request message is transmitted to the second external device based on the identification.

13. The method of claim 10, further comprising:
outputting the first region of the plurality of external electronic devices registered in the login information transmission/reception history on the display; and
when displaying the second region, visually distinguishing the second external electronic device from other items in the second region based on detecting that the second external electronic device previously transmitted and/or received the login information relevant to the application.

14. The method of claim 9, further comprising:
scanning for discoverable external electronic devices using the communication circuitry which are communicatively connectable and/or presently connected to the electronic device; and
detecting a plurality of external electronic devices by the scan,
wherein the request message requesting the login information is transmitted to the detected plurality of external devices including the specific external electronic device.

15. The method of claim 9, further comprising:
broadcasting a request message requesting the login information using the communication circuitry.

16. The method of claim 9, wherein each external electronic device is visually represented in the first and second regions using at least one of an image or a text.

* * * * *